(12) United States Patent
Naik et al.

(10) Patent No.: US 7,784,857 B2
(45) Date of Patent: Aug. 31, 2010

(54) FASTENER ASSEMBLY

(75) Inventors: Umesh Naik, Ann Arbor, MI (US); Yoshinori Kano, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 395 days.

(21) Appl. No.: 11/668,145

(22) Filed: Jan. 29, 2007

(65) Prior Publication Data

US 2008/0181745 A1 Jul. 31, 2008

(51) Int. Cl.
*F16B 39/00* (2006.01)

(52) U.S. Cl. .................................. 296/193.1; 411/107

(58) Field of Classification Search .............. 411/104, 411/107; 296/193.1, 191
See application file for complete search history.

(56) References Cited

U.S. PATENT DOCUMENTS

| | | | |
|---|---|---|---|
| 2,936,667 A | 5/1960 | Thorberg | |
| 2,976,080 A | 3/1961 | Moore | |
| 3,456,706 A | 7/1969 | Ollis, Jr. | |
| 3,469,490 A | 9/1969 | Pearce, Jr. | |
| 3,564,798 A | 2/1971 | Darby et al. | |
| 4,550,230 A * | 10/1985 | Johnson | 181/199 |
| 4,887,949 A | 12/1989 | Dimmick, III et al. | |
| 5,094,579 A | 3/1992 | Johnson | |
| 5,195,793 A * | 3/1993 | Maki | 293/155 |
| 5,253,966 A | 10/1993 | Clemens et al. | |
| 5,865,500 A * | 2/1999 | Sanada et al. | 296/193.1 |
| 5,871,319 A | 2/1999 | Schneider | |
| 6,086,300 A * | 7/2000 | Frohlich | 411/84 |
| 6,196,607 B1* | 3/2001 | Gulisano | 296/39.1 |
| 6,234,515 B1* | 5/2001 | Iwanaga | 280/728.2 |
| 6,431,585 B1* | 8/2002 | Rickabus et al. | 280/728.3 |
| 6,595,732 B2* | 7/2003 | Werner et al. | 411/104 |
| 6,669,274 B2* | 12/2003 | Barnard et al. | 296/193.1 |
| 6,705,635 B2* | 3/2004 | Hoeft et al. | 280/728.2 |
| 6,796,760 B1* | 9/2004 | Tanner | 411/107 |
| 7,189,043 B2* | 3/2007 | Benoit et al. | 411/104 |

FOREIGN PATENT DOCUMENTS

FR 2639411 A1 5/1990

* cited by examiner

*Primary Examiner*—Patricia L Engle
(74) *Attorney, Agent, or Firm*—Gifford, Krass, Sprinkle, Anderson & Citkowski, P.C.

(57) ABSTRACT

A retaining structure and fastener assembly for securing a resin panel to a vehicle body. The panel has an inner surface and a retaining structure extending outwardly from the inner surface. The retaining structure has a retaining wall with a slot for receiving a shoulder of a bolt therethrough, so that a head of the bolt is retained between the inner surface and a washer for securing the panel to the body of the vehicle. The slot is oversized relative to the shoulder of the bolt so as to define a predetermined gap therebetween to accommodate thermal expansion and contraction of the panel, thereby preventing building of the panel relative to the vehicle.

7 Claims, 2 Drawing Sheets

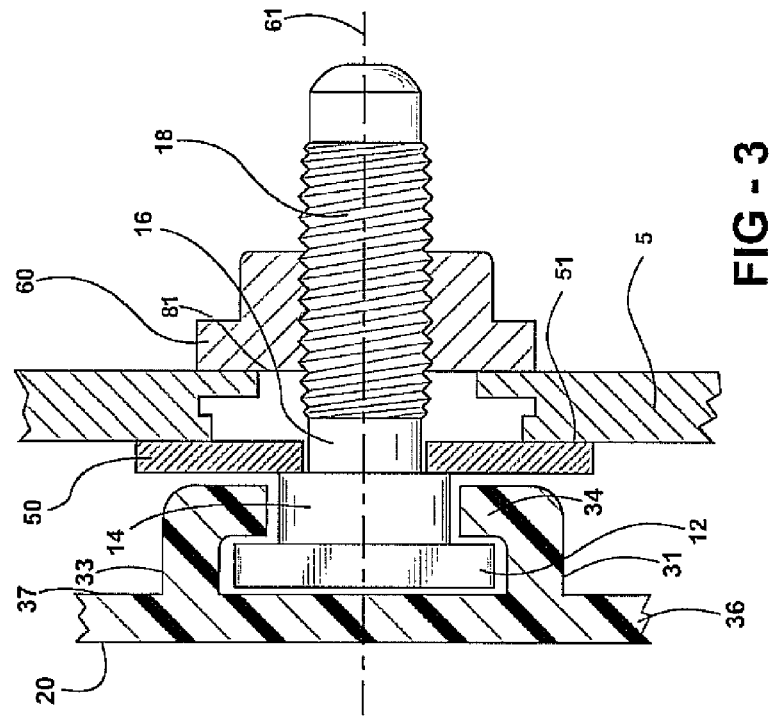
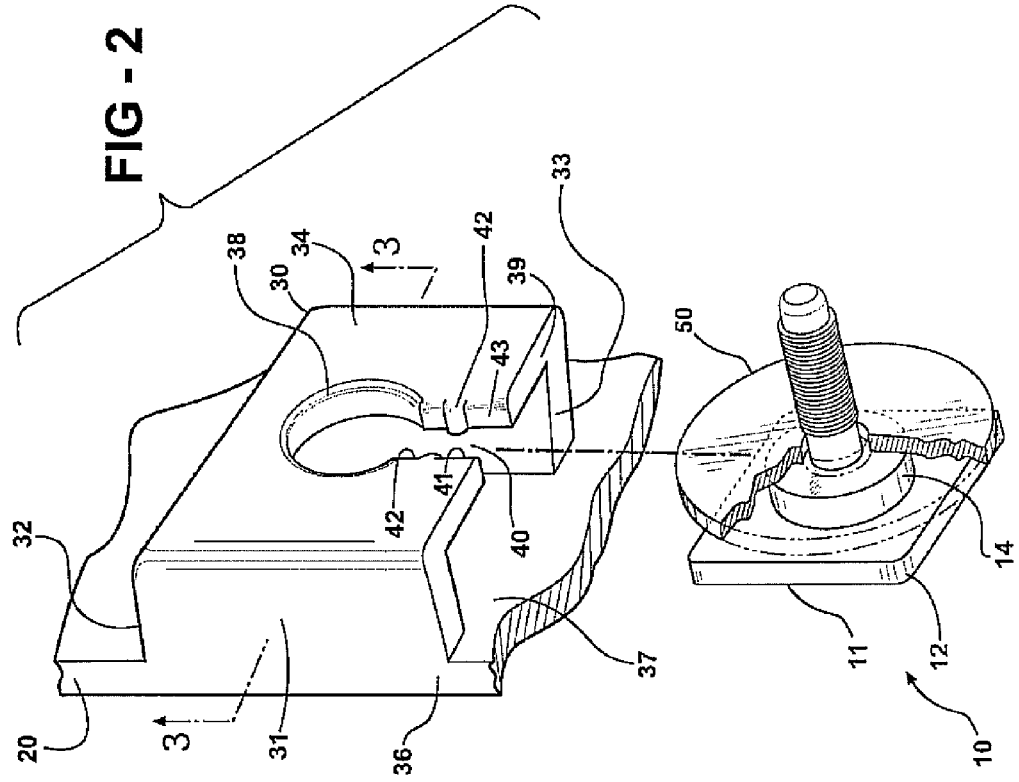

FASTENER ASSEMBLY

BACKGROUND OF THE INVENTION

1. Field of the Invention

The invention relates to a fastener arrangement for coupling a resin part to a steel part. More particularly, the invention relates to a fastener arrangement for attaching a resin panel to a vehicle, which accommodates thermal expansion of the panel relative to the vehicle.

2. Description of the Related Art

Vehicles have panels for concealing a frame and for providing the general outer appearance of the vehicle. It is common to have vehicles with panels made from different materials and, therefore, different expansion coefficients. For example, a vehicle typically includes a resin grill positioned adjacent a metal hood or side panel. Grills, being attached to the front of the vehicle near the radiator, expand due to direct heat from the sun, secondary heat from the surrounding parts, such as the hood or the radiator. This expansion may lead to a bowing or buckling of the grill, which may, in turn, result in an unsightly gap between the grill and adjoining body panels. As a secondary effect, this expansion may also lead to formation of cracks at the attachment locations of the grille due to the increased stress/bowing/building.

Thus, it remains desirable to provide a fastener that securely fastens a resin panel to a vehicle body and accommodates thermal expansion and contraction of the panel relative to the vehicle body.

SUMMARY OF THE INVENTION

According to one aspect of the invention, a vehicle includes a body, a fastener assembly and a panel. The body has a hole for securing the fastener assembly thereto. The fastener assembly includes a bolt, a nut and a washer. The bolt has a head and a threaded portion formed at opposite ends thereof. The bolt has an annular shoulder formed adjacent the head. The bolt also has a reduced diameter portion disposed between the shoulder and the threaded portion. The nut is assembled to the threaded portion of the bolt. The washer is axially retained between the shoulder and the threaded portion of the bolt. A panel has an inner surface and a retaining structure extending outwardly from the inner surface. The retaining structure has a retaining wall with a slot for receiving the shoulder of the bolt therethrough during assembly of the panel to the body. The head of the bolt is retained between the inner surface of the panel and washer. The slot is oversized relative to the shoulder of the bolt to define a predetermined gap therebetween to accommodate thermal expansion and contraction of the panel.

According to another aspect of the invention, a vehicle includes a body, a fastener assembly and a panel. The body has a hole for securing the fastener assembly thereto. The fastener assembly includes a bolt, a nut and a washer. The bolt has a head and a threaded portion formed at opposite ends thereof. The bolt has an annular shoulder formed adjacent the bead. The bolt also has a reduced diameter portion disposed between the shoulder and the threaded portion. The nut is assembled to the threaded portion of the bolt. The washer is axially retained between the shoulder and the threaded portion of the bolt. The panel has a retaining structure extending outwardly from an inner surface thereof. The retaining structure is configured to retain the head of the bolt and allow a predetermined amount of relative movement between the bolt and the panel to accommodate thermal expansion and contraction of the panel.

According to another aspect of the invention, a fastener assembly is provided for coupling a panel to a wall of a vehicle, wherein the wall includes a hole for receiving the fastener assembly therethrough. The fastener assembly includes a bolt, nut and a washer. The bolt has a head and a threaded portion. The bolt has an annular shoulder adjacent the head. The shoulder has a diameter that is smaller than the hole in the wall of the vehicle. The bolt further includes a reduced diameter portion disposed between the shoulder and the threaded portion. The nut is assembled to the threaded portion of the bolt. The washer has a diameter that is larger than the hole in the wall of the body. The washer is seated on the reduced diameter portion of the nut and retained axially between the shoulder and the threaded portion of the bolt. Opposing and spaced apart first and second bearing surfaces are defined on the washer and nut, respectively, for retaining the wall of the vehicle therebetween.

BRIEF DESCRIPTION OF THE DRAWINGS

Advantages of the present invention will be readily appreciated as the same becomes better understood by reference to the following detailed description when considered in connection with the accompanying drawing, wherein:

FIG. 2 is an enlarged perspective view of a fastener for fastening the radiator grill to the vehicle according to the invention; and FIG. 3 is a cross sectional view of the fastener of FIG. 2 shown in assembly with the radiator grill and the vehicle.

DETAILED DESCRIPTION OF THE INVENTION

Figure 1:
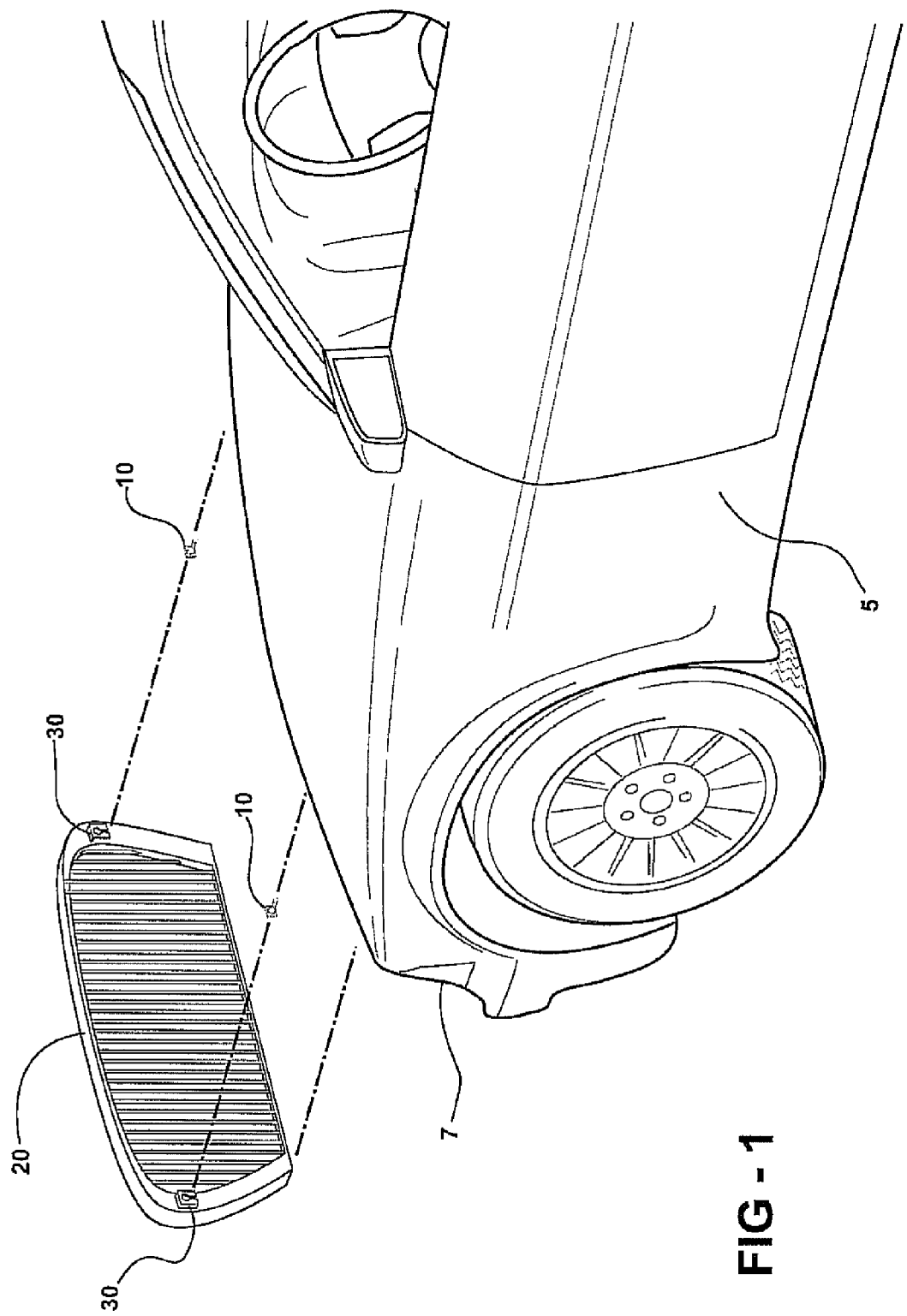
FIG. 1 is an exploded environmental view of a radiator grill coupled to the front end of a vehicle, according to one embodiment of the invention.

A fastener arrangement is provided for securing a body panel to a vehicle. The fastener arrangement is shown illustratively in FIG. 1 fastening a body panel in the form of a radiator grill 20 to a front end 7 of the vehicle 5, though it should be readily appreciated by those skilled in the art that the fastener arrangement may be used to fasten other types of body panels to other areas of the vehicle. The fastener arrangement securely fastens the grill 20 to the vehicle 5 and at the same time accommodates expansion of the grill 20 relative to the vehicle 5, so as to prevent bowing or buckling of the grill 20 during expansion when exposed to heat from the sun, secondary heat from surrounding sheet metal, and/or heat emitted by the radiator.

Referring to FIGS. 2 and 3, the fastener arrangement includes a fastener assembly 10 having a bolt 11 and a washer 50. The bolt 11 includes a rectangular or square-shaped head 12 and an annular shoulder 14. The shoulder 14 is disposed adjacent to the head 12. As shown in the cross sectional view of FIG. 3, the diameter of the shoulder 14 is smaller than the width or length of the head 12. The bolt 11 also includes a threaded portion 18 for threadingly engaging a nut 60. An unthreaded reduced-diameter portion 16 is positioned between the shoulder 14 and the threaded portion 18. The washer 50 is seated on the reduced-diameter portion 16. The diameter of the hole on washer 50 exceeds the reduced-diameter portion 16 and is less than the diameter of the threaded portion 18. The purpose of the reduced-diameter portion 16 is to enable the washer 50 to be axially retained between the shoulder 14 and the threaded portion 18 and thereby allow the bolt 11 and washer 50 to be combined into the fastener assembly 10 prior to sub-assembly to the grill 20 or to the body 5. Alternatively, if a reduced-diameter portion 16 is not provided, the diameter of the hole on washer 50 will have to exceed the diameter of the threaded portion 18 which will allow the washer 50 to be separately inserted over the threaded portion 18 after sub-assembly of the bolt 11 either to the grill 20 or to the body 5.

The fastener arrangement also includes a "dog-house" or fastener retaining structure 30 formed on the grill 20. Preferably, at least a pair of retaining structures 30 is provided on opposite sides of the grill 20. The retaining structure 30 is adapted to secure the fastener assembly 10 to the grill 20. More specifically, the retaining structure 30 includes a main wall 36 having an inner surface 37 that faces the vehicle 5. A plurality of connecting walls 31, 32, 33 extends orthogonally from the inner surface 37. The connecting walls 31, 32, 33 are arranged orthogonally relatively to each other. A retaining wall 34 is generally parallel and spaced apart from the main wall 36. The connecting wall 32, 33 extends between and connect the main wall 36 and the retaining wall 34 to form an open ended box-like structure.

The square or rectangular shaped bolt head 12 and the conforming shape of the orthogonal connecting walls 31, 32, 33 of the retaining structure together prevent rotation of the bolt 11.

The retaining wall 34 includes an open end 39 spaced apart and generally parallel with one of the connecting walls 32. A slot 40 is formed along the open end 39 of the retaining wall 34. The slot 40 extends to a middle portion of the retaining wall 34. The slot 40 has an entrance portion defined by a pair of generally parallel side edges 41, 43. The side edges 41, 43 of the slot 40 are spaced apart to receive the shoulder 14 of the bolt 11 therethrough. A pair of tabs 42 extends inwardly toward each other from respective side edges 41, 43. The ends of the tabs 42 are spaced apart by a distance that is slightly less than the diameter of the shoulder 14, so as to form a press fit with the bolt 11 when the shoulder 14 is inserted therethrough. In one embodiment of the invention, the tabs 42 extend at least 1 mm from the side edges 41, 43. An end portion of the slot 40 is defined by a circular edge 38 that extends between the side edges 41, 43 and defines a circular aperture adjacent the entrance portion. The diameter of the circular aperture is wider than the distance between the side edges 41, 43.

In use, the fastener assembly 10 is first inserted into the fastener retaining structure 30 in the direction illustrated by the arrow in FIG. 2. Specifically, the bolt head 12 is aligned with the open side of the retaining structure 30. Simultaneously, the shoulder 14 is aligned with the slot 40 and pushed past the tabs 42 to be seated within the circular aperture defined by the edge 38. As shown in FIG. 3, the head 12 and shoulder 14 protrude outwardly from the inner surface 37. The sides of the head 12 are aligned with and positioned adjacent respective connecting walls 32, so as to prevent rotation of the bolt 11 relative to the grill 20. The grille 20 is assembled to the vehicle by aligning the bolt axis 61 with the hole on the body 5. As shown in FIG. 3, the washer 50 and retainer wall 34 are aligned parallel to the sheet metal wall 5. The sheet metal wall 5 is retained between a first bearing surface 51 on the washer 50 and a second bearing surface 81 on the nut 60. The thickness of the retaining wall 34 is slightly less than the distance between the head 12 and the washer 50, so as to allow the shoulder 14 to act as a spacer and thereby enable transverse and axial movement of the grill 20 relative to the fastener 11. By this arrangement, the grill 20 is able to thermally expand and contract without budding along the seams defined between the grill 20 and adjacent body panels.

In an alternative embodiment, the head 12 and shoulder 14 of the fastener assembly 10 may be insert-molded, heat-staked, or threaded into the fastener retaining structure 30 rather than providing a slot 40 in the retaining wall 34 for inserting the bolt 11 into the structure 30. The shoulder 14 and threaded portion 18 in this embodiment would extend through a hole formed in the retaining wall 34. In the threaded embodiment, the shoulder 14 will be threaded to enable the bolt 11 to be installed to the retaining structure by a tapping operation. Furthermore, the shoulder 14 would be extended to replace the bolt head 12.

In another embodiment, the bolt 11 is first inserted through a hole in a sheet metal wall of the vehicle body 5. As shown in FIG. 3, the sheet metal wall 5 is retained between a first bearing surface 51 on the washer 50 and a second bearing surface 81 on the nut 60. The head 12 and shoulder 14 protrude outwardly from the sheet metal wall 5. The grill 20 is assembled to the vehicle by aligning the retainer wall 34 against the metal wall 5 or washer 50, and positioning the slot 40 in alignment with the shoulder 14 of the bolt. The grill 20 is pushed in a transverse direction relative to the bolt 11, such that the shoulder 14 is pushed passed the tabs 42 and seated in the circular aperture defined by the edge 38.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A vehicle comprising:
a body having a hole;
a fastener assembly comprising a bolt, a nut and a washer, the bolt having a head having a flat edge and a threaded portion formed at opposite ends thereof, the bolt having an annular shoulder formed adjacent the head, the bolt having a reduced diameter portion disposed between the shoulder and the threaded portion;
the nut being assembled to the threaded portion of the bolt;
the washer being axially retained between the shoulder and the threaded portion of the bolt;
a panel having an inner surface and a retaining structure extending outwardly from the inner surface, the retaining structure having a retaining wall with a slot for receiving the shoulder of the bolt therethrough during assembly of the panel to the body, the head of the bolt being retained between the inner surface of the panel and the retaining wall, the shoulder contacting the washer and the reduced diameter portion passing through the washer and partially into the hole of the body, the washer retained between the shoulder and the body, the slot including tabs separated from each other less than a diameter of the shoulder, wherein the height of the shoulder is greater than the thickness of the retainer wall so as to allow a predetermined amount of axial displacement of the retaining structure relative to the fastener assembly to accommodate thermal expansion and contraction of the panel.

2. A vehicle as set forth in claim 1, wherein the retaining structure includes a connecting wall extending between the inner surface and the retaining wall.

3. A vehicle as set forth in claim 1, wherein the slot has a generally circular shaped edge that extends between generally parallel and spaced apart side edges, the circular shaped edge defining a generally circular aperture for supporting the shoulder of the bolt therein.

4. A vehicle as set forth in claim 3, wherein the diameter of the shoulder is less than the diameter of the circular aperture in the retaining wall to define a gap of at least 0.1 mm for accommodating the expansion and contraction of the panel, thereby preventing buckling of the panel relative to the vehicle.

5. A vehicle as set forth in claim 1, wherein the predetermined amount of axial displacement is at least 0.3 mm.

6. A vehicle as set forth in claim 1, wherein the panel extends longitudinally between opposite and spaced apart sides, the panel having at least two retaining structures disposed at respective sides of the panel.

7. A vehicle as set forth in claim 1, wherein the panel is a radiator grill.

* * * * *

UNITED STATES PATENT AND TRADEMARK OFFICE
CERTIFICATE OF CORRECTION

| | | |
|---|---|---|
| PATENT NO. | : 7,784,857 B2 | |
| APPLICATION NO. | : 11/668145 | |
| DATED | : August 31, 2010 | |
| INVENTOR(S) | : Umesh Naik et al. | |

It is certified that error appears in the above-identified patent and that said Letters Patent is hereby corrected as shown below:

Cover Page, item (57), Abstract line 11, replace "building" with --buckling--

Column 1, line 25, replace "building" with --buckling--

Column 1, line 58, replace "bead" with --head--

Column 3, line 64, replace "budding" with --buckling--

Signed and Sealed this
Tenth Day of May, 2011

David J. Kappos
*Director of the United States Patent and Trademark Office*